United States Patent
Burkert et al.

(10) Patent No.: US 7,822,093 B2
(45) Date of Patent: Oct. 26, 2010

(54) METHOD AND APPARATUS FOR CHANGING THE LENGTH OF A LASER PULSE

(75) Inventors: Alfons Burkert, Jena (DE); Joachim Bergmann, Jena (DE); Wolfgang Triebel, Jena-Cospeda (DE); Ute Natura, Jena (DE)

(73) Assignee: Hellma Materials GmbH & Co. KG, Jena (DE)

( * ) Notice: Subject to any disclaimer, the term of this patent is extended or adjusted under 35 U.S.C. 154(b) by 200 days.

(21) Appl. No.: 12/235,066

(22) Filed: Sep. 22, 2008

(65) Prior Publication Data

US 2009/0080478 A1   Mar. 26, 2009

(30) Foreign Application Priority Data

Sep. 24, 2007 (DE) .................. 10 2007 045 454

(51) Int. Cl.
*H01S 3/083* (2006.01)
(52) U.S. Cl. ......................... 372/94; 372/700
(58) Field of Classification Search .......... 356/493, 356/487, 498; 372/93, 94, 700
See application file for complete search history.

(56) References Cited

U.S. PATENT DOCUMENTS

| 5,337,333 | A  | * | 8/1994 | Daly et al. ............... 372/94 |
| 6,944,204 | B2 | * | 9/2005 | Zhou et al. .............. 372/109 |
| 2005/0063051 | A1 | | 3/2005 | Lange et al. |
| 2008/0218691 | A1 | | 9/2008 | Fercher |

FOREIGN PATENT DOCUMENTS

| DE | 40 30 240 | 2/1991 |
| DE | 10 2005 027 898 | 12/2006 |
| EP | 1 496 383 | 1/2005 |
| WO | 2005/074789 | 8/2005 |

\* cited by examiner

*Primary Examiner*—Minsun Harvey
*Assistant Examiner*—Patrick Stafford
(74) *Attorney, Agent, or Firm*—Michael J. Striker

(57) ABSTRACT

The apparatus for extending or lengthening a laser pulse has a beam splitter. An incident laser pulse is split by the beam splitter into at least one first partial pulse and a second partial pulse. The first partial pulse is conducted through a delaying travel path section with a number of reflectors. The apparatus is characterized by a plurality of the variable delaying travel path sections which produce different length laser beam pulses from a single incident laser pulse.

24 Claims, 6 Drawing Sheets

METHOD AND APPARATUS FOR CHANGING THE LENGTH OF A LASER PULSE

CROSS-REFERENCE

The subject matter disclosed in the following description is also described in German Patent Application DE 10 2007 045 454.8, filed on Sep. 24, 2007 in Germany. This German Patent Application provides the basis for a claim of priority of invention for the aforesaid subject matter under 35 U.S.C. 119(a) to (d).

BACKGROUND OF THE INVENTION

1. The Field of the Invention

The present invention relates to delaying travel path sections for changing the pulse durations of laser pulses, an apparatus for producing elongated laser pulses, and a method for extending the length or duration of laser pulses by means of a plurality of delay path sections.

2. Description of the Related Art

The lengthening or elongation of laser pulses is already known. For example, it is used in order to reduce the intensities of laser pulses, since a material to be tested with the help of a pulsed laser could be damaged by a high intensity pulsed laser beam. Also the intense laser pulses could lead to a premature aging of the optics used in lithography. The laser pulse is divided into different partial pulses by means of a beam splitter in order to lengthen the laser pulse. The respective partial pulses are guided over different-length travel path sections (delay loops) and reach an object to be examined or illuminated in succession. U.S. Pat. No. 5,337,333 describes a method of formatting laser pulses in which on or more delay loops are used. The delay loops include a beam splitter and a plurality of reflectors. An elongated laser pulse with reduced peak intensities is produced from a short intense laser pulse.

The prior art apparatuses for extending the duration or lengthening laser pulses are adapted to or designed for respective specific laser systems. They lengthen a given laser pulse to a predetermined pulse width. A combination of the known apparatus with other laser systems, for example of different manufacturers, or of different qualities, is not possible without further effort.

SUMMARY OF THE INVENTION

It is an object of the present invention to provide a method and apparatus for producing an elongated laser pulse or for lengthening a laser pulse, which does not have the above-described disadvantages.

It is a further object of the present invention to provide a method and apparatus for extending the duration of a laser pulse, which is simply and rapidly adapted to various different laser systems and/or different applications.

It is another object of the present invention to provide a method and apparatus for generating a laser pulse of various different lengths or durations from a single incident laser pulse of given length, which is simple and rapidly adapted to various different laser systems and/or different applications.

The aforesaid objects of the invention are attained by the apparatus and method according to the appended independent claims. Advantageous further embodiments are claimed in the appended dependent claims.

According to the invention the apparatus for changing the length of a laser pulse has a beam splitter, by which in incident laser pulse is divided into at least one first partial pulse and a second partial pulse. The at least one first partial pulse is reflected, if necessary many times and then is again divided. The second partial pulse passes through the beam splitter and leaves the delaying travel path section according to the invention on a direct path. Subsequently the at least one first partial pulse is again combined with the second partial pulse after an appropriate delay. In addition the delaying travel path section has a plurality of reflectors arranged along a delaying travel path for guiding the first partial pulse and all additional partial pulses resulting from its travel over the delaying travel path. The laser pulse resulting from the combination of the first partial pulse and the second partial pulse has an extended duration or length in comparison to that of the original incident laser pulse, while the pulse intensity is reduced. Furthermore according to the invention the beam splitter is shiftable from an engaged position to a disengaged position, in which the beam splitter is outside a laser beam travel path in the disengaged position. The term "laser beam path" according to the present invention means the optical path, on which the laser beam enters the delaying travel path section according to the invention. When the beam splitter is in the disengaged position the entire laser beam passes through the apparatus without any portion traversing the delaying travel path, and the laser pulses are not lengthened or extended in their duration.

The delaying travel path section or device may be advantageously switched on or off in this way, when the beam splitter is moved into the disengaged or the engaged position. This adjustment for example can occur by a local displacement of the beam splitter. Similarly an adjustment of the engaged position or the disengaged position can occur by displacing or switching optical elements, which either conduct the laser beam through the beam splitter or not according to their position. The delaying travel path section according to the invention thus facilitates an adaptation in a simple way, for example to the laser that is used, the measurement to be performed, or the exposure. It is especially advantageous that the laser beam properties of the laser that is employed, such as the beam cross-section, the wave front curvature, and the divergence, remain the same in the elongated pulses produced by the method and apparatus according to the invention. The beam properties will remain particularly the same, when a correctly aligned and telecentric 1:1-imaging delaying travel path section or device is used. As reflectors, at least four concave mirrors are used in preferred embodiments of the method and apparatus according to the invention. These concave mirrors are arranged like an at least double 1:1 telescope.

According to a preferred embodiment of the invention the beam splitter is shifted between or put in the engaged position and the disengaged position automatically or manually by a mechanical displacement means or device. The mechanical displacement device for example acts by moving the beam splitter into or out of the laser beam path. Alternatively or in addition optical elements, such as reflectors, could be shifted or displaced by the mechanical displacement means so that the laser beam is guided through the beam splitter or not. Particularly preferably the mechanical displacement means has a linear displacement device, especially a linearly movable table on which the beam splitter is mounted. Likewise it is preferable in an alternative embodiment to arranged one or more optical elements for influencing the laser beam path on the linearly movable path. The delaying travel path section according to the invention may thus be conveniently and advantageously coupled or decoupled with the laser beam without changing the experimental setup. In this way it is possible to provide a plurality of delaying travel path sections according to the invention, which can be turned on or off, so that different lengthened pulse durations may be produced essentially according to choice by the operator of the apparatus. A difficult or laborious adjustment of the apparatus to change the pulse length is not required. Moreover a constant beam profile is especially advantageously available with different pulse lengths and even over the entire pulse width. Accordingly measurements with different pulse lengths can be directly compared with each other. For example, it is possible to derive functional interrelationships for the material characteristics from measurements with different pulse lengths.

One skilled in the art knows that the delaying travel path section according to the invention in principle allows the passage of arbitrary continuous electromagnetic radiation, which is why the general expression "laser beam" is used here. However the function of changing the pulse length is of course limited to pulsed laser radiation.

The beam splitter has a ratio of the reflected radiation to the transmitted radiation, which quantitatively determines the intensity ratio of the first partial pulse to the second partial pulse. The fraction of the total radiation that is transmitted by the beam splitter usually amounts to between 20% and 80%, especially 30% and 70%, but 40%±5% and/or ±2% is especially preferred. The delaying travel path section according to the invention has at least one correcting element for correction of beam displacement caused by the beam splitter. The correcting element is movable between a correcting position K and a neutral position P. The beam displacement caused by the beam splitter can be compensated, but that is only necessary when the beam splitter is active in the engaged position B. Especially the beam splitter of a second delaying travel path section can act as the correcting element for the beam displacement in a first delaying travel path section.

According to a further preferred embodiment of the invention the reflectors for guiding the diverted first partial pulse can be constructed as highly reflective mirrors in order to avoid additional optical elements, such as concentrating or collecting lenses. Concave mirrors are particularly preferred. Highly reflective mirrors are unusually coated with processes known to those skilled in the art, so that they reflect nearly all light that falls on them. Such mirrors are designed as HR-mirrors. High quality concave mirrors with a hardened and tempered surface advantageously permit an at least approximately loss-free reflection. The concave mirrors have a radius of curvature, which is as great as the distance to the next reflector. Since the divergence adjustment of the laser beam is performed by the first delaying travel path section, the beam middle is located in the center of the path between the concave mirrors.

The subject matter of the invention also includes an apparatus for producing extended duration or lengthened laser pulses with a plurality of delaying travel path sections. Preferably several of the delaying travel path sections are constructed according to the present invention. An apparatus, with which a laser pulse can be extended or lengthened in its duration, is called a pulse stretcher. This is possible without further effort simply by turning on or off at least one delaying travel path section according to the invention. Plural delaying travel path sections are each switchable between an active and an inactive state in preferred embodiments of the invention. In this way testing of materials by means of laser pulses is made easier and simpler. The materials can be exposed to different laser pulses of different duration and peak intensity, without changing the beam profile, for example regarding beam cross section, wave front curvature, or divergence. It is especially advantageous that an economical single stage laser with comparatively poor beam properties can be used.

The apparatus according to the invention preferably has a lens or a lens system for adjustment of the beam properties of a laser. The laser beam first passes through the lens or lens system prior to passing through the delaying travel path section. Particularly preferably divergence, especially of the wave front curvature, of the laser beam is partially compensated by a cylindrical lens. The comparatively large divergence of the beam of a low-cost single stage laser due to the comparatively large wave front curvature, which can lead to different (poorer positions) positions of the beam middle, and thus which can lead to unequal loads and destruction of the optical components, may be partially compensated in an advantageous manner, so that the beam middle is arranged approximately centrally between the reflecting mirrors of the delaying travel path section. The laser beam that is used for example can have a rectangular cross-section so that the cylindrical lens can only correct divergence of the long dimension of the laser cross-section. Advantageously a uniformly low beam load on the optical elements, for example the mirrors, is attained in the delaying travel path section and thus allows the use of different laser sources in the apparatus according to the invention, because of the use of the lens and/or the lens system adapted to the laser beam properties prior to the delaying travel path section.

According to a preferred embodiment of the invention the lengths of the individual delaying travel path sections differ from each other by a ratio of integral powers of two. For example in the case of three delaying travel path sections, the ratios of their lengths are 4:2:1. Preferably a more weakly modulated temporal intensity distribution results with increasing numbers of delaying travel path sections. In order to obtain as long a pulse length as possible one delaying travel path section should produce a pulse delay of the size of the pulse length and the second delaying travel path section should have twice that length. An additional delaying travel path section with a length that is equal to half the first can be used to make the temporal pulse profile more uniform.

Preferably a correcting element, which acts to correct the beam displacement, is associated with one or more delaying travel path sections. Each delaying travel path section can be associated with a correcting element. Likewise the apparatus preferably has one or more correcting elements, which are independent of the delaying travel path sections. For example, a beam displacement can be compensated with two delaying travel path sections connected in series and even by their beam splitters, so that additional correcting elements are not required. This latter saving is advantageous since a reduced number of optical elements leads to reduced losses.

According to an additional preferred embodiment of the invention the delaying travel path sections are mounted in a vibration-damping or vibrationless manner. For example the apparatus has an especially stable base. The delaying travel path sections preferably have a supporting frame made of aluminum sections, so that the entire apparatus is comparatively stabilized against vibration. The aluminum sections and essentially the entire apparatus especially preferably have a laser radiation, especially UV radiation, absorbing coating, e.g. especially made of polycarbonate, e.g. MAKROLON®.

The subject matter of the present invention also includes a process for lengthening or extending the duration of laser pulses with a plurality of delaying travel path sections, one or more of which is turned on or off, when a beam splitter is moved into an engaged or into a disengaged position. In the disengaged position the beam splitter is positioned outside of the laser beam path.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1A:
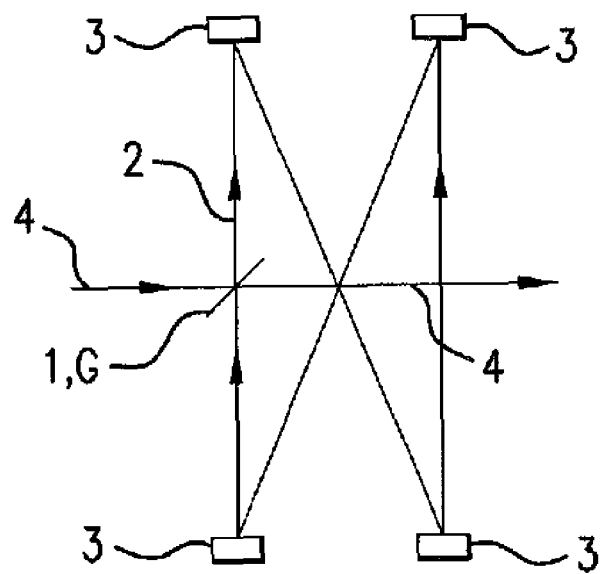
FIGS. 1a and 1b are respective schematic action views of a first embodiment of a delaying travel path section for extending the duration of a laser pulse according to the present invention.
Figure 1B:
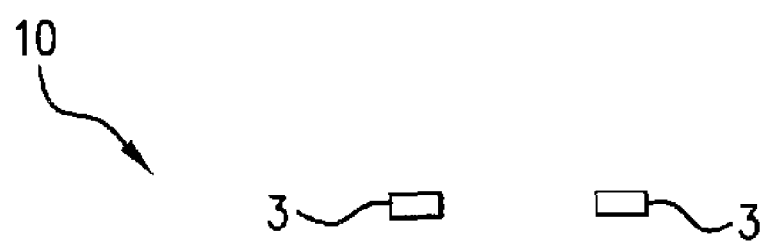
Figure 1B:
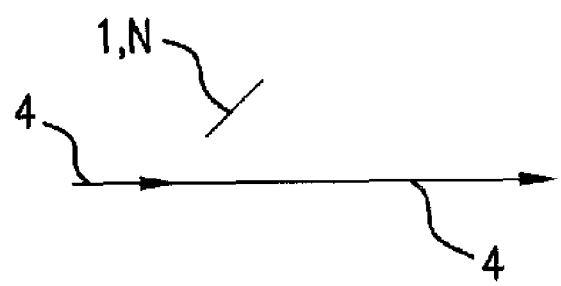
Figure 1B:

A first embodiment of a delaying travel path section or device 10 for extending the duration of a laser pulse according to the present invention is shown in FIGS. 1a and 1b. The delaying travel path section 10 shown in FIG. 1a is active, since a beam splitter 1 is arranged in an engaged position G, in which the beam splitter 1 is located in a laser beam path 4. A part of the laser beam, which falls on the beam splitter 1, is reflected by it so that it traverses a delaying travel path 2. The part of the laser beam that is not reflected by the beam splitter passes through the beam splitter 1. The reflected or deflected part of the incident laser pulse is called the first partial pulse in this disclosure, while the part that passes through the beam splitter is called the second partial pulse. The propagation direction of the laser beam is shown by the arrows in FIGS. 1a and 1b. The laser beam is deflected many times by means of the reflectors 3 (preferably concave mirrors) and again reaches the beam splitter 1, where another part of the beam is reflected again by the beam splitter. This other part of the laser beam then leaves the delay travel path section 10 on the same laser beam path 4, as the second partial pulse, generally delayed for a time interval, which is required for the laser beam to pass along the delaying travel path. Then a part of the first partial pulse again passes through the beam splitter 1 and traverses the delaying travel path 2. The part of the original incident laser pulse that remains in the delaying travel path section 10 becomes less intense with each passage through the beam splitter 1 and in practice becomes negligibly smaller after about four passages.

The illustrated embodiment of the apparatus including the beam splitter 1 and the reflectors 3 is exemplary and in principle can be changed in arbitrary ways or according to choice. The guidance of the laser beam in the illustrated manner is advantageous, since a comparatively long delaying travel path 2 is provided within a comparatively small space. The long dimension of the device 10 is traversed many times by the laser beam.

In contrast, FIG. 1b shows the device with the beam splitter 1 in the disengaged position N. The laser beam passes along the inactive delaying travel path 2 without being divided into the partial pulses. According to the invention the beam splitter 1 is moved from the engaged position G to the disengaged position N, or by means of optical elements, which are not shown in the drawing. The laser beam is guided over the laser beam path 4 so that it does not fall on the beam splitter.

Figure 2A:
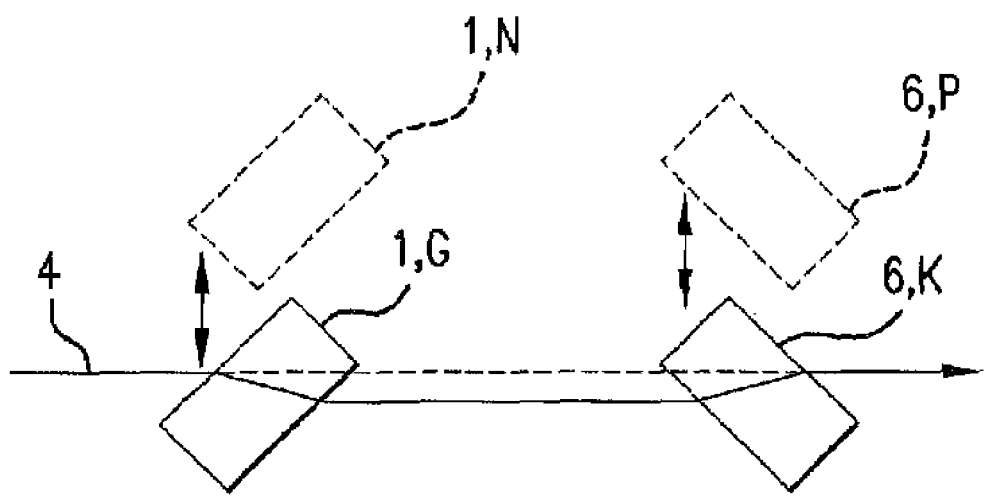
FIGS. 2a and 2b are schematic action views of respective devices for correcting beam misalignment according to preferred embodiments of the pulse delaying travel path section according to the invention, with different operating modes shown with dotted lines.
Figure 2B:
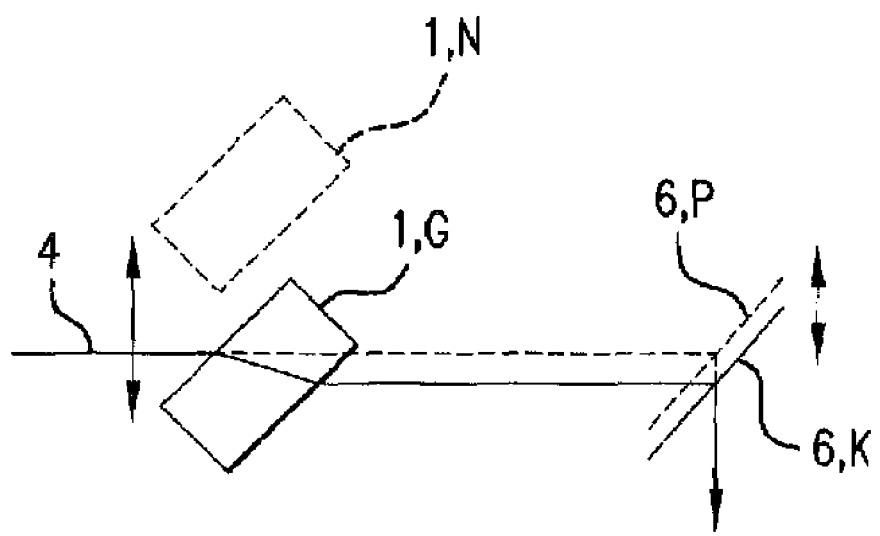

FIGS. 2a and 2b schematically illustrate two possible corrections of the beam displacement. For example, the beam displacement arises in the laser pulse, which impinges on the beam splitter 1 and is divided on leaving it, and thus is displaced in relation to the direction of the original laser beam path 4. The beam splitter 1 according to the invention can be shifted or moved into an engaged position G or into a disengaged position N. Since a beam displacement only occurs with the beam splitter 1 in the engaged position, according to a preferred embodiment the displacement is then compensated, when a correcting element 6 is shifted from a neutral position P to a correcting position K. The correcting element 6 can be arranged in respective delaying travel path sections or devices 20, when more than one of these sections or devices is included in the apparatus.

In FIG. 2a a correcting element 6 is illustrated showing its correcting position K with solid lines and its neutral position P with dotted lines. A plane plate is used in the embodiment illustrated in FIG. 2a as the correcting element. The laser beam experiences two refractions, one on entering and another on leaving, when it passes through the plane plate 6. Thus the beam displacement resulting from passage through the beam splitter may be compensated by orienting the plane plate 6 is a suitable position. When the beam splitter 1 is in the disengaged position N, no correction is required. This is indicated by the dashed course of the laser beam. The double arrows illustrate the motion direction of the beam splitter 1 and the correcting element 6, whereby displacement of the laser beam path 4 relative to the beam splitter 1 and the correcting element 6 would be possible.

In the embodiment shown in FIG. 2b the displacement is compensated by a mirror as correcting element 6, which is especially possible when the laser beam should be reflected for the purpose of a direction change. The correcting element 6 consisting of the mirror in this embodiment is shifted into the neutral position P or into the correcting position K when the beam splitter is in the disengaged position N or the engaged position G respectively, so that the laser beam is guided along the same path after reflection in each case.

Figure 3:
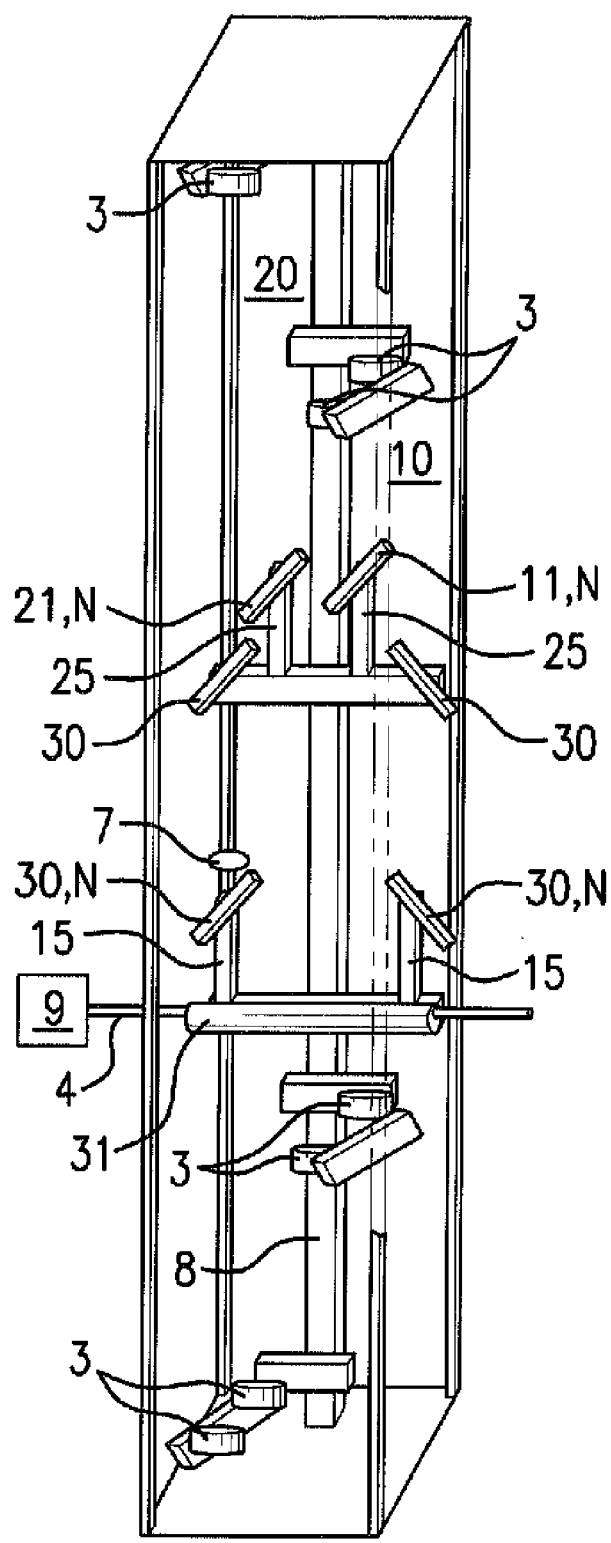
FIGS. 3 to 5 are respective action views of an apparatus according to the invention for extending the duration or lengthening a laser pulse shown in different operating modes in the different figures.

In FIG. 3, an apparatus according to the invention for lengthening or extending the duration of a laser pulse is shown in perspective. The apparatus has two delaying travel path sections 10, 20, each of which have reflectors 3 arranged differently with respect to each other in order to provide different delay times. The laser beam splitter 11 of a first delaying travel path section 10 is shown in its disengaged position N in FIG. 3. As is shown later in FIGS. 4 and 5 both delaying travel path sections 10, 20 in the illustrated apparatus can be switched so that the laser pulse passes through only one or both of the delaying travel path sections. The position of the beam splitter 21 is similarly shown in the disengaged position N. Other embodiments are likewise possible. The beam splitters 11, 21 are preferably switched so that they permit further guidance of the laser beam passing through them in as unpolarized a condition as possible. In this way an especially uniform pulse is produced with as continuously uniform polarization as possible.

The elements of the delaying travel path sections 10, 20, such as the reflectors 3, the beam splitters 11, 21, the adjusting means 15, 25, a cylindrical lens 7 and the additional mirror 30, are pivotally mounted on a supporting frame 8, for example made of aluminum. The apparatus is preferably vibrationally decoupled or isolated from the laser 9. The apparatus is preferably connected with an unshown following measuring station in a vibrationless or vibration-damping manner. A base or understructure is provided with a weight of about 160 kilograms. The entire apparatus preferably has a coating of polycarbonate, which provides additional stiffness. Similarly it is preferably that the polycarbonate does not transmit light of wavelength 193 nanometers, for example as emitted by the laser 9.

The apparatus has doors and side walls, which are shown cutaway or partially in the drawing. One skilled in the art knows that apparatus of this sort are rinsed or flushed with nitrogen, whereby advantageously absorption of laser radiation by oxygen and ozone formation can be avoided. Moreover the apparatus preferably has unshown oxygen sensors. During operation of the apparatus with the mirror 30 in the disengaged position N (shifting means 15), in which no deflection of the laser beam from its laser beam path 4 occurs, a beam guide pipe 31 can be employed so that evacuation or rinsing of the remaining part of the apparatus with nitrogen can be avoided.

The reflectors 3 can be mirrors, especially concave mirrors. An especially loss-free reflection can be obtained by high quality concave mirrors with surface coatings. The reflectivity preferably amounts to at least 98% with a curvature radius of 3 meters and a mirror diameter of 50 mm. This is especially advantageous, since the laser pulse should be lengthened with as small losses as possible. An apparatus efficiency of about 60% with 120 ns pulse length is a desirable goal.

Typical lithographic applications currently involve energy densities in a range from 10 to 20 millijoule/cm$^2$. Usually materials are evaluated with energy densities above these values in order to attain a rapid aging of the materials to be tested. Especially an output pulse energy density is obtained, which is required for the material testing.

During use of the aforesaid apparatus a single stage excimer laser with poor beam characteristics is sufficient for producing elongated or lengthened laser pulses of sufficiently high pulse energy. Laser pulses of the excimer lasers cannot be lengthened with the lasers themselves because of the applicable electrical discharge process. They should be extended by the apparatus according to the invention to about 80 to 200 ns, especially 100 to 170 ns, and preferably to about 120±10 nanoseconds.

Figure 4:
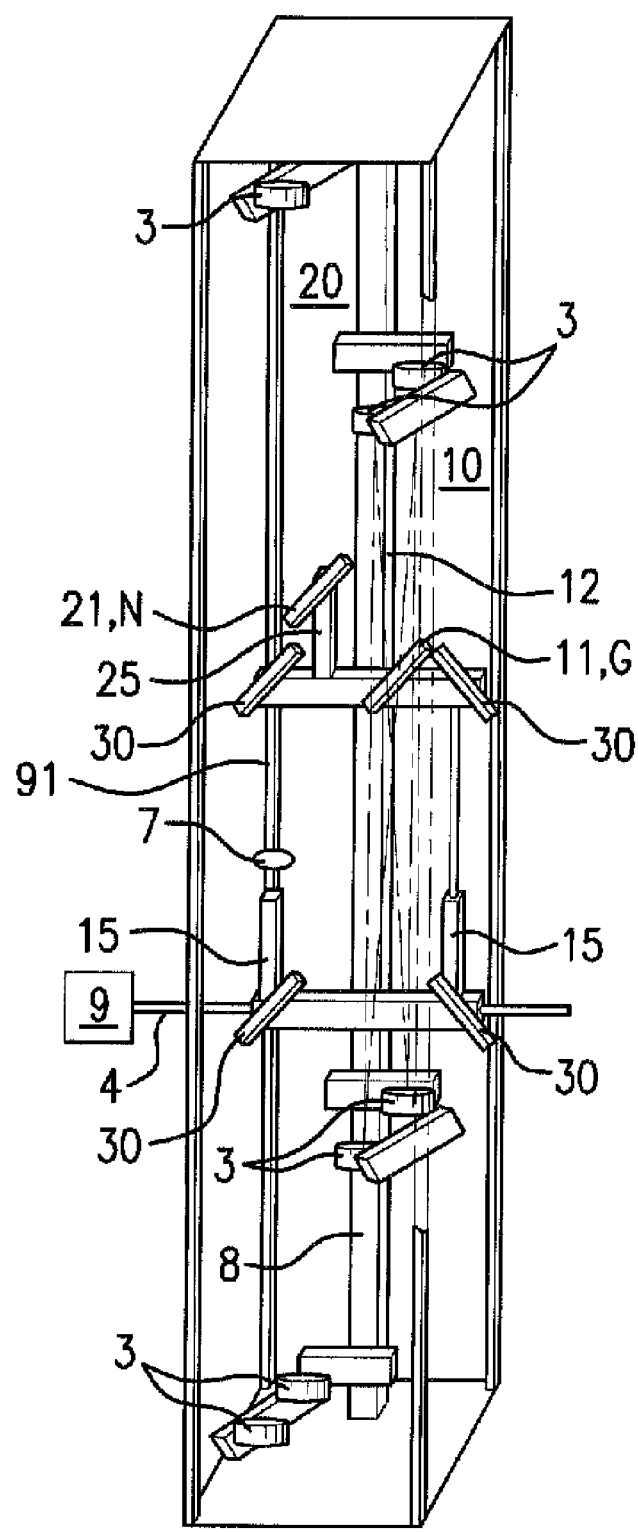

The apparatus according to the invention shown in FIG. 4 corresponds to that shown in FIG. 3, but is in a different operating state. The first delaying travel path section 10 is active here, and the beam splitter 11 is located in its engaged position G. The shifting of the beam splitter 11 into its engaged position G occurs with the help of a mechanical shifting or displacement means 25. The engagement or activation of the delaying travel path 91 occurs here by means of the mechanical shifting means 15 so that the lower guide mirror 30 is pushed into the original laser beam path 4 and changes it accordingly. In contrast, the second delaying travel path section 20 is inactive, since the beam splitter 21 is located in the disengaged position N. Possible divergence of the laser 9 is compensated by the cylindrical lens 7. The cylindrical lens 7 here for example is a lens made of CaF$_2$ with a diameter of 50 mm and a focal length of 4 meters.

Figure 5:
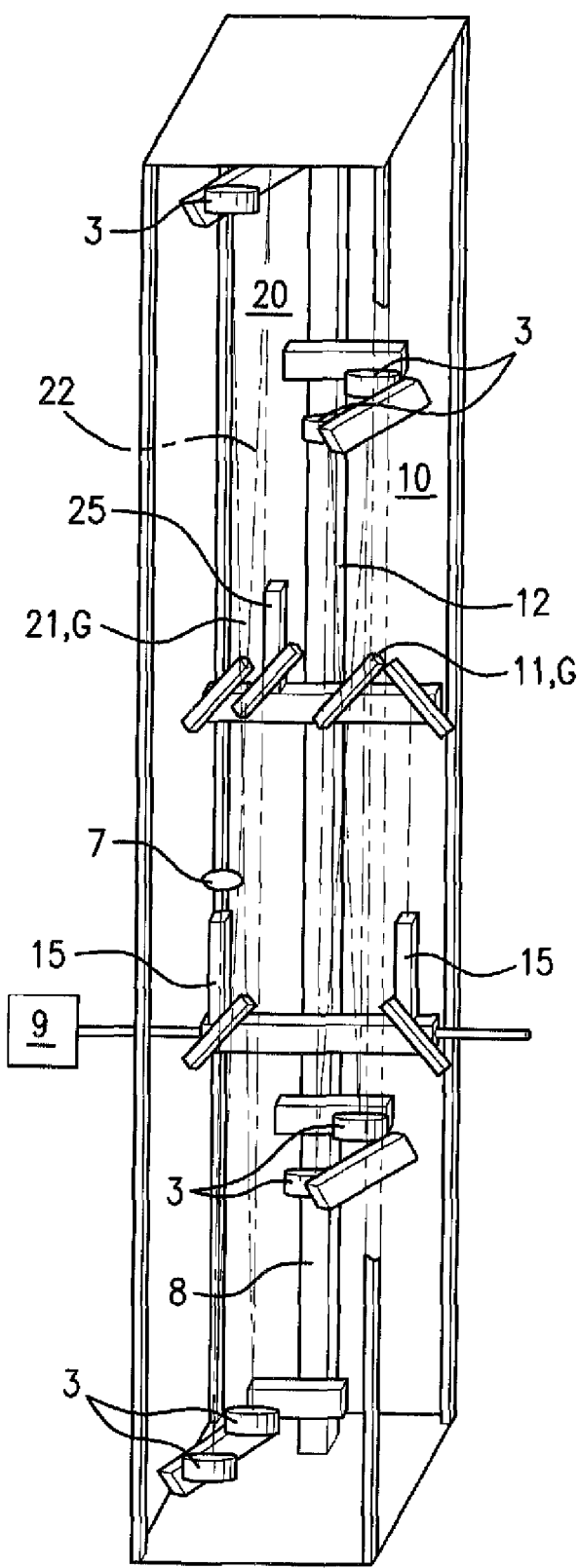

The apparatus according to the invention shown in FIG. 5 corresponds to that shown in FIGS. 3 and 4, but is in a further different operating state. Both delaying travel path sections 10, 20 are active here. In the operating state according to FIG. 4 the beam splitter 21 was shifted into is engaged position G with the mechanical shifting means 25. The respective reflected part of the laser beam passes through the delaying travel path 12 and 22. The longer delaying travel path 22 has a length of about 12 meters, which corresponds to a delay of about 40 nanoseconds. The shorter delaying travel path 10 is about half as long, as the longer delaying travel path 22.

Figure 6:
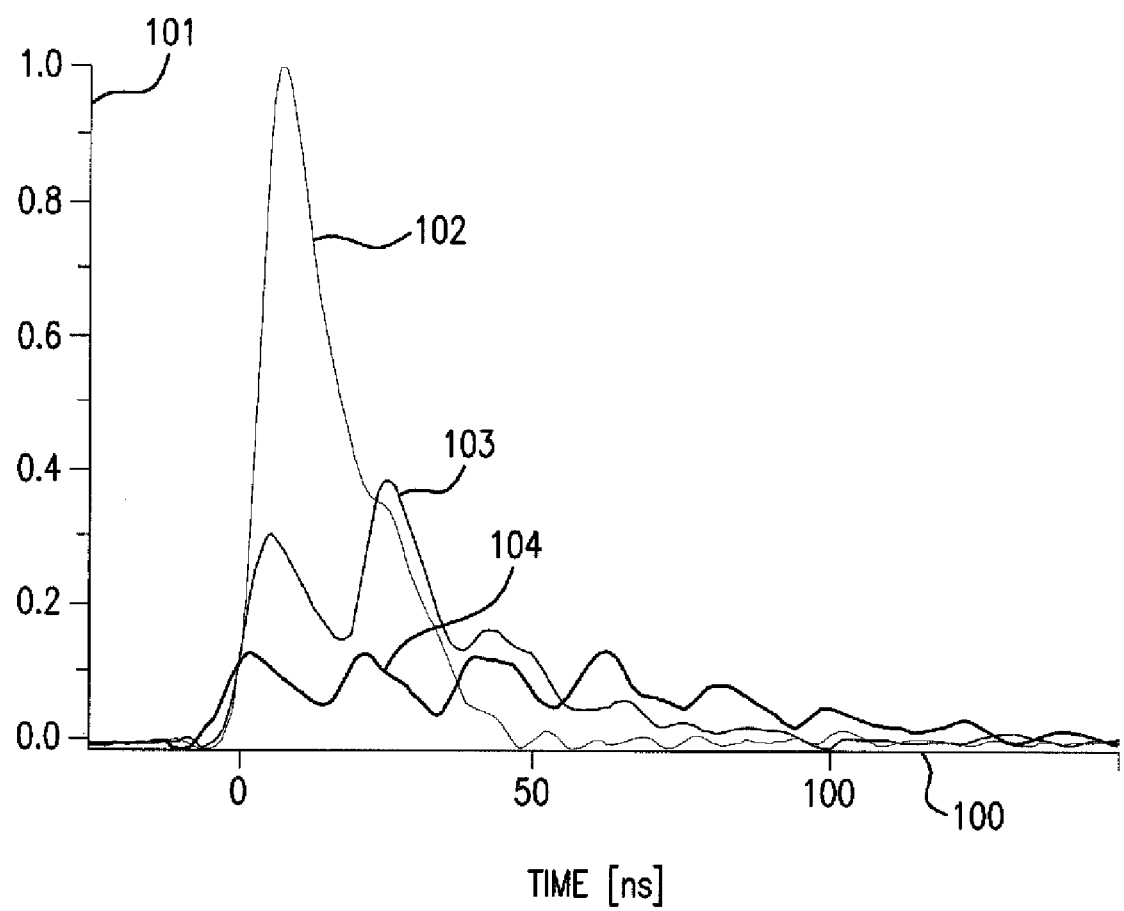
FIG. 6 is a graphical illustration of different length laser pulses obtained after passing through the apparatus shown in FIGS. 3 to 5.

FIG. 6 is a graphical illustration of the time dependence of the intensities of the laser pulses, which pass through the apparatus according to the invention and indeed in the configuration shown in FIGS. 3 to 5. The time in ns appears on the abscissa 100. The relative laser pulse intensity appears on the ordinate 101. The curve 102 shows a laser pulse, which was not delayed, for example from the apparatus as shown in FIG. 3. The curve 103 corresponds to the delay produced by one delaying travel path, for example from the apparatus as shown in FIG. 4. The intensity is clearly reduced in contrast to the curve 102, while the pulse is wider, here about 65 nanoseconds. The pulse that is lengthened by two delaying travel path sections 10, 20 with the apparatus in the state shown in FIG. 5 is illustrated in curve 104. The peak intensity here is scarcely more than a tenth of the peak intensity of the not broadened pulse 102. The width of the pulse 104 amounts to about 120 nanoseconds. The modulation of the temporal intensity distribution decreases with increasing number of the delaying travel path sections, which can be seen by comparing curves 102, 103, and 104.

While the invention has been illustrated and described as embodied in a method and apparatus for changing the length or duration of a laser pulse, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An apparatus (10, 20) for changing the length or duration of an incident laser pulse, said apparatus comprising
   at least one beam splitter (1, 11, 21) for dividing the incident laser pulse into a first partial pulse and a second partial pulse, and
   a plurality of reflectors (3) for deflecting the first partial pulse, said reflectors being arranged to guide the first partial pulse along a delaying travel path (2, 12, 22);
   wherein the at least one beam splitter is shiftable into an engaged position (G) or into a disengaged position (N) and wherein said at least one beam splitter (1, 11, 21) is located outside of a laser beam travel path (4) in the disengaged position (N) and is located in the laser beam travel path (4) in the engaged position (G).

2. The apparatus as defined in claim 1, further comprising means for automatically or manually shifting said at least one beam splitter (1, 11, 21) between said engaged position (G) and said disengaged position (N).

3. The apparatus as defined in claim 2, wherein said means for automatically or manually shifting is a mechanical means (15, 25) for providing a linear motion of said at least one beam splitter (1, 11, 21).

4. The apparatus as defined in claim 3, wherein said mechanical means (15, 25) is a displaceable table on which said at least one beam splitter (1, 11, 21) is mounted.

5. The apparatus as defined in claim 3, wherein said mechanical means (15, 25) is a displaceable table on which at least one optical element (30) for influencing the laser beam path (4) is mounted.

6. The apparatus as defined in claim 1, wherein said reflectors (3) for guiding said first partial pulse are HR-coated mirrors.

7. The apparatus as defined in claim 1, wherein said reflectors (3) for guiding said first partial pulse are concave mirrors.

8. The apparatus as defined in claim 7, wherein each of said concave mirrors in the delaying travel path has a curvature radius that is as long as a distance to a following mirror arranged in the delaying travel path.

9. The apparatus as defined in claim 1, wherein the at least one beam splitter (1, 11, 21) has a ratio of transmitted radiation intensity to reflected radiation intensity in the delaying travel path of 20 to 80%.

10. The apparatus as defined in claim 9, wherein said ratio is from 30 to 70%.

11. The apparatus as defined in claim 9, wherein said ratio is 40%.

12. The apparatus as defined in claim 1, further comprising at least one correcting element (6) for correction of a beam displacement produced by said at least one beam splitter (1, 11, 21), and wherein said at least one correcting element is shiftable between a neutral position (P) and a correcting position (K).

13. An apparatus for changing the lengths or durations of laser pulses, said apparatus comprising a plurality of delaying travel path sections (10, 20), wherein at least one of said delaying travel path sections (10, 20) comprises
at least one beam splitter (1, 11, 21) for dividing the a laser pulse into a first partial pulse and a second partial pulse, and
a plurality of reflectors (3) for deflecting the first partial pulse, said reflectors being arranged to guide the first partial pulse along a delaying travel path (2, 12, 22);
wherein the at least one beam splitter (1, 11, 21) is shiftable into an engaged position (G) or into a disengaged position (N) and wherein said at least one beam splitter (1, 11, 21) is located outside of a laser beam travel path (4) in the disengaged position (N) and is located in the laser beam travel path (4) in the engaged position (G).

14. The apparatus as defined in claim 13, wherein each of said delaying travel path sections (10, 20) is individually switchable between an active operating state and an inactive operating state in which the incident laser pulse is not lengthened or extended.

15. The apparatus as defined in claim 13, wherein said delaying travel path sections (10, 20) are structured so that the lengths or the durations of the laser pulses produced by different delaying travel path sections are different.

16. The apparatus as defined in claim 15, wherein said lengths or said durations of said laser pulses from said different delay travel path sections (10, 20) are related to each in ratios of integral powers of 2.

17. The apparatus as defined in claim 13, wherein at least one of said delaying travel path sections comprises a correcting element (6) that corrects for displacement of a laser beam passing there through.

18. The apparatus as defined in claim 13, further comprising a lens or lens system for partial adjustment of laser beam properties of a laser (9) and wherein said lens (7) or lens system is arranged so that said laser beam path of said laser passes through said lens or lens system.

19. The apparatus as defined in claim 13, further comprising a cylindrical lens (7) for compensating laser beam divergence.

20. The apparatus as defined in claim 13, further comprising means for mounting said delaying travel path sections (10, 20) with means for suppressing vibration.

21. The apparatus as defined in claim 13, further comprising a supporting framework (8) for supporting said delaying travel path sections (10, 20) and wherein said supporting framework is an aluminum frame.

22. The apparatus as defined in claim 21, wherein said aluminum frame has a laser beam absorbing coating.

23. The apparatus as defined in claim 22, wherein said laser beam absorbing coating comprises a polycarbonate.

24. A method of extending the lengths or durations of laser pulses by means of delaying travel path sections (10, 20), in which at least one of the delaying travel path sections is switchable between an active state in which said at least one of said delaying travel path sections (10, 20) extends the length or duration of an incident laser pulse and an inactive state in which said at least one of said delaying travel path sections (10, 20) does not extend the length or duration of the incident laser pulse, said method comprising the step of putting a beam splitter (1, 11, 21) in an engaged position (G) or in a disengaged position (N);
wherein said beam splitter (1, 11, 21) is located outside of a laser beam travel path in the disengaged position and is located in the laser beam travel path in the engaged position.

* * * * *